April 14, 1964  JACQUES-ANDRE STOHR ETAL  3,129,140
FUEL ELEMENTS FOR NUCLEAR REACTORS
Filed Aug. 17, 1959  2 Sheets-Sheet 1
FIG. 1.
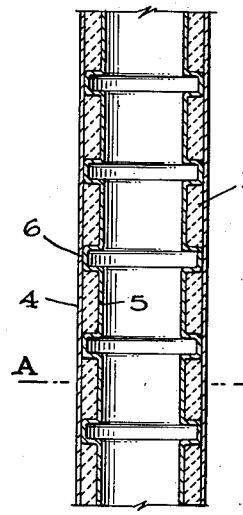
FIG. 3.
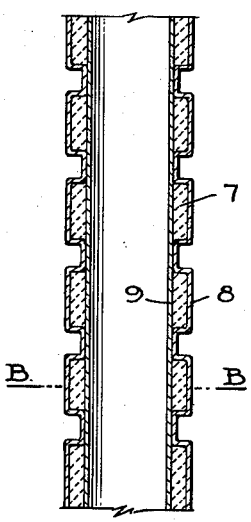
FIG. 5.
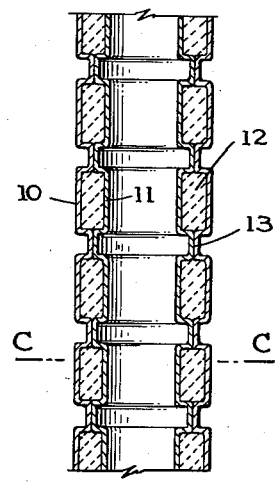
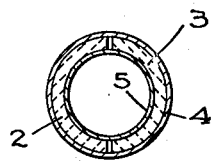
FIG. 2.
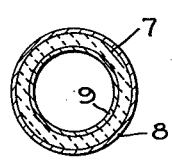
FIG. 4.
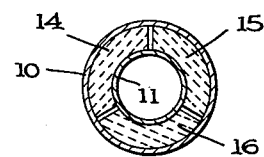
FIG. 6.
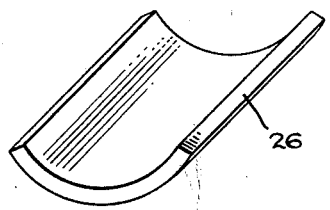
FIG. 11.

April 14, 1964  JACQUES-ANDRE STOHR ETAL  3,129,140
FUEL ELEMENTS FOR NUCLEAR REACTORS
Filed Aug. 17, 1959  2 Sheets-Sheet 2

United States Patent Office 3,129,140
Patented Apr. 14, 1964

3,129,140
FUEL ELEMENTS FOR NUCLEAR REACTORS
Jacques-André Stohr, Bures-sur-Yvette, and Maurice Gauthron, Paris, France, assignors to Commissariat a l'Energie Atomique, Paris, France
Filed Aug. 17, 1959, Ser. No. 834,135
Claims priority, application France Aug. 21, 1958
5 Claims. (Cl. 176—76)

In heterogeneous atomic reactors, the fuel generally takes the form of small bars or small rods enclosed in a sheath which imparts satisfactory mechanical behaviour to the whole, and insulates the fuel from the cooling fluid.

When the fuel in these reactors is uranium, it is generally used in the metallic state. The use in such reactors of fuels which are not such good conductors of heat as metallic uranium, for example uranium oxide or uranium carbide, may lead to high temperature gradients and excessive differences in temperature inside the fuel, so that it may be advantageous to split up the fuel.

The mechanical conditions imposed on the sheath are usually satisfied by increasing its thickness, which unfortunately involves additional absorption of neutrons, and impairs heat transfer.

Sometimes the fuel element is split up into small-diameter rods assembled in "clusters," thus allowing the temperature inside the fuel to be equalised, and the element to be made more rigid, without increasing the thickness of the sheath; this last property may also be imparted to fuel elements by using solid cylindrical elements made up of rods of different diameters stacked inside a thin sheet-metal sheath which is corrugated on to the rods.

According to the present invention there is provided a fuel element for a nuclear reactor comprising two concentric annular sheaths between which are located annular bodies of ceramic fuel concentric and in contact with the sheaths, and held in position by deformation of at least one of the sheaths, the fuel being sealed within the sheaths.

According to a further feature of the present invention there is provided a fuel element for a nuclear reactor comprising two concentric annular sheaths and a plurality of annular bodies of ceramic fuel located between the sheaths and concentric and in contact therewith, the annular bodies being spaced from one another axially of the sheaths, located with respect to one another by deformation of at least one sheath and sealed within the sheaths.

According to another feature of the present invention there is provided a fuel element for a nuclear reactor comprising two concentric annular sheaths and a plurality of abutting annular bodies of ceramic fuel between and concentric with the sheaths, neighbouring bodies being of unequal and alternate bodies of equal radial thickness, at least one sheath being deformed so that each body is in contact with both sheaths and the fuel being sealed within the sheaths.

According to yet a further feature of the present invention there is provided a fuel element for a nuclear reactor comprising two concentric sheaths and a plurality of spaced groups of annular bodies of ceramic fuel, each group being concentric with and between the sheaths and comprising a plurality of abutting annular bodies at least one of the sheaths being deformed so that each body is in contact with both sheaths and each group is spaced from the neighbouring group and the fuel being sealed within the sheaths.

Each fuel body may be a single unit, or may be split up into a plurality of parts along its generatrices; it has been general practice to split up into two semi-cylindrical parts, each part then having the shape of a round tile, the tiles being assembled in pairs to form rings.

The undulations which may be produced by plastic deformation when the final profile is being imparted to the sheath increase the surface area of the latter, thus improving contact with the cooling fluid.

The profiled sheath may be the external or internal sheath of the fuel element.

Both sheaths may be profiled.

The sheaths are produced from two metal tubes of different diameters which are concentrically disposed in order to leave the space required for the fuel bodies. Before the metal tubes are plastically deformed on to the fuel, corrugation is first of all effected by a preliminary small degree of plastic deformation if the fuel is liable to be crushed, thus preventing the fuel from being subsequently crushed.

If the fuel is of a resistant nature, it will be sufficient to hold it in place by punching the sheath at certain points or by using a frame before plastically deforming the sheath on to the fuel.

The fuel element has an advantageous degree of heat transfer, a satisfactory degree of rigidity in the element, and acceptable absorption of neutrons.

If this element is compared with a known structure with a smooth sheath, the element will have the following points in its favour for a given degree of rigidity:

(1) Improved contact between the fuel and sheath and improved contact between the sheath and cooling fluid, chiefly by an increase in the surface area of the zones in contact per unit weight of fuel;

(2) A thinner sheath.

Heat transfer is improved for these different reasons.

In order that the present invention may be well understood there will now be described some embodiments thereof, given by way of example only, reference being had to the accompanying drawings in which:

FIGURES 1, 3 and 5 are axial sections through three hollow annular elements according to the invention, using rings of the same height and the same thickness, only one sheet being profiled in the case of the elements in FIGURES 1 and 3, and both sheets being profiled in the case of the element in FIGURE 5.

FIGURES 2, 4, 6, 8 and 10 are sections AA, BB, CC, DD, EE respectively, perpendicular to the axes of the elements illustrated in FIGURES 1, 3, 5, 7 and 9 respectively.

FIGURE 11 is an isometric projection of a fuel tile.

Only the elements required for an understanding of the invention are illustrated, corresponding elements bearing identical reference numbers.

Figure 7:
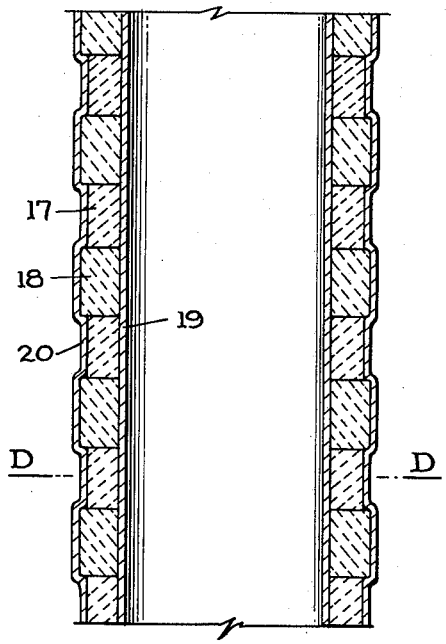
FIGURE 7 is an axial section through a fourth element according to the invention, comprising two sorts of rings, one of the sheets being profiled.

The element illustrated in FIGURES 1 and 2 will be seen to comprise ceramic fuel rings or bodies such as 1, which are identical and separated from one another.

Each fuel ring is formed by juxtaposing two semi-cylindrical tiles 2 and 3. The sheath of the element is formed by two sheath parts the smooth metal tube 4 and the profiled sheet 5 produced by plastically deforming a second smooth metal tube on to the fuel. The two sheets forming the sheath are in contact between the fuel rings in zones such as 6. The projecting parts of the sheath are inside the hollow element.

The element illustrated in FIGURES 3 and 4 will be seen likewise to comprise ceramic fuel elements such as 7, which in this case are in a single unit, and the two metal sheets 8 and 9 forming the sheath of the element. The sheet 8 is so profiled that the projecting parts of the sheath are outside the hollow element.

FIGURES 5 and 6 show a third element; the two metal sheets 10 and 11 forming the sheath are both profiled; the ceramic fuel rings such as 12, all of the same height and the same thickness, are separated from one another, thus allowing both sheets forming the sheath to be in contact in zones such as 13.

Each ring is formed by juxtaposing three tiles 14, 15 and 16 in $UO_2$ form. The projecting parts of the sheath are inside and outside the hollow element.

Figure 8:
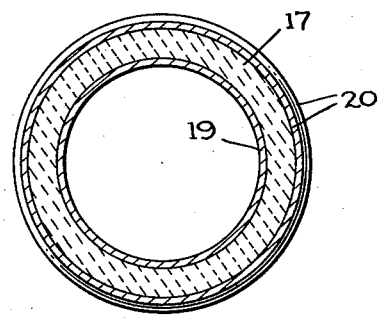

FIGURES 7 and 8 show a fourth element wherein the fuel rings are stacked in contact with one another, thin rings such as 17 being alternated with thick rings such as 18. The metal sheath comprises the smooth tube 19 and the metal sheet 20, which is so profiled that the projecting parts of the sheath are outside the hollow element.

Figure 9:
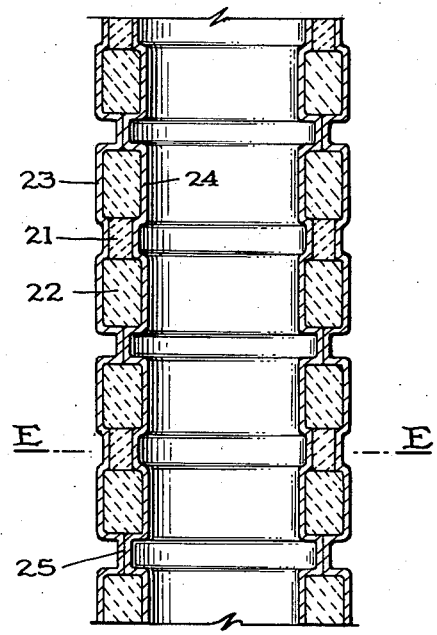
FIGURE 9 is an axial section through a fifth element according to the invention, comprising groups of several rings of different thicknesses, both sheets being profiled.
Figure 10:
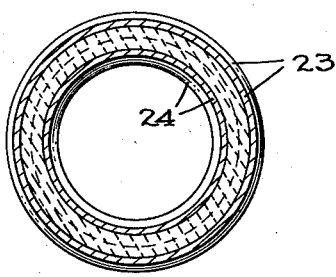

FIGURES 9 and 10 show a fifth element wherein the fuel rings are put together in groups of three, one short thin ring such as 21 being disposed between two high thick rings such as 22. The two sheets 23 and 24 forming the sheath are in contact in the zones such as 25 which separate each group of three rings. In this case the rings are in one unit. The sheath has projecting parts on both sides of the hollow element.

FIGURE 11 shows a fuel tile 26; putting together 3 tiles identical with that illustrated gives a cylindrical ring which may be used in a structure according to the invention.

What is claimed is:

1. In a fuel element for a nuclear reactor, a plurality of rings of ceramic fuel aligned and spaced along their longitudinal axes, an exterior thin metal sheath surrounding and in intimate contact with the exterior surfaces of said rings, an interior thin metal sheath engaging and in intimate contact with the interior surfaces of said rings, said sheaths being in contact between said rings whereby said sheaths retain said rings in their relative longitudinal axial positions in the fuel element.

2. A fuel element as described in claim 1 in which said rings have the same radial thickness and the same interior diameter.

3. A fuel element as described in claim 1 in which said rings have different radial thicknesses and have the same interior diameter.

4. A fuel element as described in claim 1 in which said rings have different radial thicknesses, have different interior diameters and are arranged in groups with adjacent groups spaced from each other.

5. A fuel element as described in claim 1 in which each of said rings comprises at least two arcuate tiles of fuel.

References Cited in the file of this patent

UNITED STATES PATENTS

| | | |
|---|---|---|
| 2,856,340 | Wigner et al. | Oct. 14, 1958 |
| 2,874,459 | Haldeman | Feb. 24, 1959 |
| 2,956,000 | Kendall et al. | Oct. 11, 1960 |
| 3,004,906 | Binstock | Oct. 17, 1961 |
| 3,030,291 | Butler et al. | Apr. 17, 1962 |
| 3,043,761 | Reynolds | July 10, 1962 |
| 3,053,743 | Cain | Sept. 11, 1962 |

FOREIGN PATENTS

| | | |
|---|---|---|
| 789,257 | Great Britain | Jan. 15, 1958 |